United States Patent Office 3,100,208
Patented Aug. 6, 1963

3,100,208
N₁-(p-TOLUENE SULFONYL)-N₂-(α-TETRA-HYDROFURYL METHYL) UREA

Erich Haack, Heidelberg, Adolf Hagedorn, Mannheim-Waldhof, Heinrich Ruschig, Bad Soden, Taunus, and Gerhard Korger, Frankfurt am Main Hochst, Germany, assignors to C. F. Boehringer & Soehne G.m.b.H., Mannheim-Waldhof, Germany, a corporation of Germany
No Drawing. Original application Nov. 23, 1956, Ser. No. 623,618, now Patent No. 2,964,560, dated Dec. 13, 1960. Divided and this application Dec. 12, 1960, Ser. No. 75,090
Claims priority, application Germany Nov. 28, 1955
1 Claim. (Cl. 260—347.2)

The present invention relates to orally effective compounds for treating diabetes and more particularly to orally effective antidiabetic sulfonyl urea compounds, and to a process of making same.

The present application is a division of copending application Serial No. 623,816, filed November 23, 1956, now Patent No. 2,964,560, and entitled "Orally Effective Compounds for Treating Diabetes and a Process of Making Same."

At present the treatment of human diabetes consists in dietary restriction and parenteral administration of insulin. During the last decades many attempts have been made to replace insulin by an orally effective antidiabetic agent. All these attempts, however, have failed, either because of the unreliable activity of such agents or because of the toxic side-effects encountered on their administration. For instance, diguanidine compounds with a high molecular alkylene residue were administered as orally effective antidiabetic agents but have been found to be rather toxic and, therefore, unsatisfactory. Other compounds which exhibit oral antidiabetic activity, such as the glucokinins, have proved to be quite unreliable in their blood sugar lowering effects. A number of other compounds have shown some oral antidiabetic activity in animal experiments. They are, however, rather toxic and, therefore, have not been clinically tested in view of their disagreeable side-effects. Compounds of this type are heterocyclic derivatives of sulfanilamides and more particularly sulfanilamido thiodiazole substituted by an ethyl, isopropyl, or butyl radical.

None of the known blood sugar lowering compounds meet the requirements of a clinically useful, orally effective antidiabetic agent. Such an agent must combine low toxicity especially with regard to liver, adrenal glands, and central nervous system, with highly reliable antidiabetic action. Furthermore, such an agent must not exert an intense, shock-like effect, but must provide a sustained antidiabetic effect at a persistently satisfactorily level so that dangerous hypoglycemic conditions are avoided.

It is one object of the present invention to provide such orally effective antidiabetic compounds which meet all the above mentioned requirements, which are substantially non-toxic and substantially free of obnoxious side-effects, which do not exert an initial shock-like action, but a rather prolonged uniform and fully reliable action on the carbohydrate metabolism of the human, and which, in contrast to the known sulfanilamide thiodiazoles, have not only shown antidiabetic activity in animal experiments, but also in the clinical treatment of diabetes.

Another object of the present invention is to provide simple and effective processes of producing such new and valuable orally effective antidiabetic compounds.

A further object of the present invention is to provide a method of treating diabetes by orally administering to diabetic patients such an orally effective antidiabetic compound in predetermined dosages taken at predetermined periods of time.

Other objects of the present invention and advantageous features thereof will become apparent as the description proceeds.

In principle, orally effective antidiabetic compounds according to the present invention are benzene sulfonyl urea compounds of the following Formula I

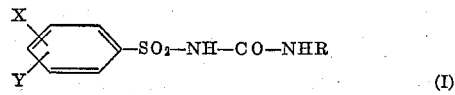

(I)

In said formula

X and Y represent hydrogen, an alkyl radical, preferably a lower alkyl radical, or an alkoxy group, preferably a lower alkoxy group,
R represents a cyclic radical containing at least one of the hetero atoms oxygen and/or sulfur.

Sulfonyl urea compounds according to the above given Formula I contain the following amino group —NHR

| Group | Formula |
|---|---|
| α-Tetrahydrofuryl methylamino | —NH—CH₂—CH—CH₂ with CH₂—CH₂ and O ring |
| 2-n-propyl dioxane-(1,3)-amino-(5) | —NH—CH with CH₂—O and CH₂—O, CH—CH₂—CH₂—CH₃ |

The blood sugar lowering effect of N₂-substituted sulfonyl urea compounds is not limited to compounds having the above defined substituents and forming the object of the present invention as follows from an investigation of the pharmacological properties of this group of sulfonamides. However, extent and character of the side-effects, to a large extent, appear depending upon the type of the N₂-substituent. For instance, sulfonyl urea compounds substituted by higher alkyl radicals are comparatively toxic. In contrast thereto, the presence of at least one of the hetero atoms oxygen and/or sulfur in the N₂-substituent and the interruption of their carbon chain or ring by such hetero atoms results in an entirely unexpected and very considerable reduction of the toxicity of such compounds without substantially diminishing their antidiabetic action.

The present invention, thus, is based upon the fact that presence of the hetero atoms oxygen and/or sulfur in the molecule of the N₂-substituent results in a very considerable reduction of toxicity. This is proved by comparison with other sulfonyl urea compounds and, therefore, the theory may be advanced that this rule is of general validity, although the present invention is by no means limited to such a theory.

The compounds according to the present invention do not possess a bacteriostatic action comparable to that of sulfanilamides. This lack of bacteriostatic activity can sometimes be of advantage when using the new compounds as antidiabetic agents. For instance, the intestinal flora is not affected by such compounds and, furthermore, there is no danger that pathogenic germs might become resistant to sulfanilamides when using such compounds continuously.

Sulfonyl urea componds according to the above given Formula I are produced, for instance, according to methods as they are ordinarily employed in the synthesis of substituted urea compounds. However, the simplest method, namely reaction of a suitable sulfonyl chloride with a correspondingly substituted urea compound has the disadvantage that the yield of the new sulfonyl urea compounds is quite low and that a considerable number and amount of by-products is formed. The reason for the low yield is that the sulfonyl group not only combines with the nitrogen atom of the urea compound but that it also and even preferably combines with its oxygen atom, thereby yielding an isourea compound. The resulting isourea compound readily splits off sulfonic acid and forms the corresponding substituted cyanamide.

According to the present invention the new compounds are prepared, for instance, by reacting a salt of the sulfonamide and especially the alkali metal salt of the sulfonamide with a suitably substituted carbamic acid chloride according to the following Equation A:

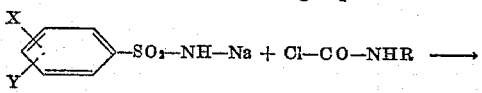

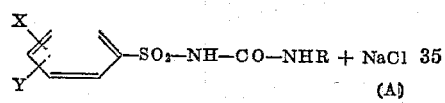

(A)

It is also possible to produce the new sulfonyl urea compounds, for instance, by reacting a suitable sulfonamide with an ester of isocyanic acid according to the following Equation B

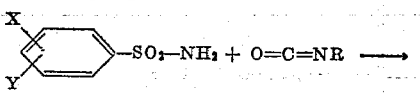

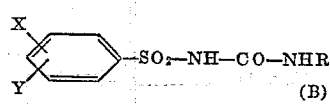

(B)

By reversing the above mentioned reaction B first a sulfonyl isocyanate compound is produced from a suitable derivative of a sulfonamide and said isocyanate compound is then caused to react with a suitable amino compound according to the following Equation C:

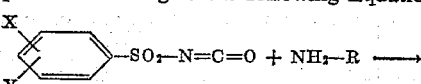

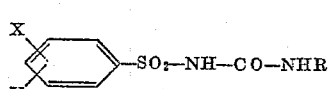

(C)

The starting sulfonyl isocyanate compounds can be obtained, for instance, by reacting a suitable sulfonyl chloride with silver cyanate, by reacting a sulfonamide with phosgene, or by thermal decomposition of a suitable sulfonyl derivative of carbamic acid according to the following Equation C-1:

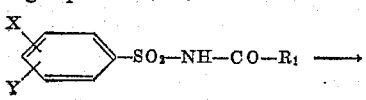

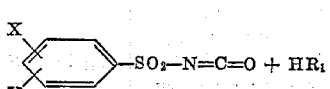

(C-1)

In said formula $R_1$ indicates, for instance, a substituted or unsubstituted alkoxy, phenoxy, alkylamino, phenylamino, dialkylamino, diphenylamino, or a benzene sulfonic acid amide group which is substituted by the substituents X and/or Y.

The resulting sulfonyl isocyanate componds are highly reactive. Therefore, thermal decomposition is preferably carried out in the presence of the respective amine. Thereby, the amine is immediately and directly condensed with the sulfonyl isocyanate in statu nascendi, i.e. as soon as formed. In place of the amine, salts of the amine may be used in this reaction. It is advisable to employ as substituent $R_1$ a group which forms a compound H—$R_1$ that can readily be separated from the resulting sulfonyl urea compound and that does not compete in its reactivity with the amine to be introduced into the molecule.

The above mentioned methods, however, are not the only methods which lead to the desired compounds. For instance, a substituted isourea alkyl ether can be reacted with a benzene sulfonic acid chloride substituted by the groups X and Y and the resulting sulfonyl isourea compound is then split up by treatment with hydrogen halide of the formula HHal to an alkyl halogenide and the desired sulfonyl urea compound according to the following Equation D:

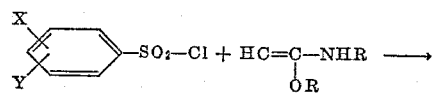

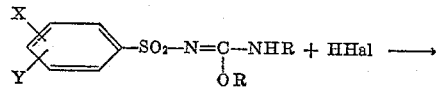

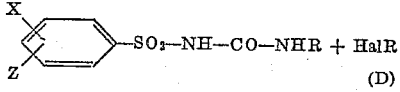

(D)

Other derivatives of carbonic acid can also be used as starting materials. An undesired group present in such starting materials can be replaced by the oxygen atom, for instance, by hydrolysis, or can be converted into oxygen by other methods, for instance, by oxidation. Thus, for instance, a guanidine derivative can be converted by alkaline hydrolysis into the corresponding urea compound, or a thiourea compound can be oxidized, for instance, with nitrous acid to the desired sulfonyl urea compound. The following Equations E and F illustrate such methods of producing the new and valuable sulfonyl urea compounds according to the present invention:

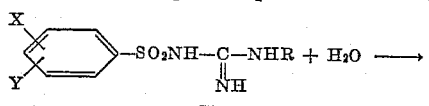

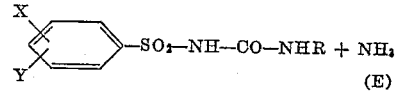

(E)

Conversion of the thiourea compound (the reaction, most probably, proceeds as indicated):

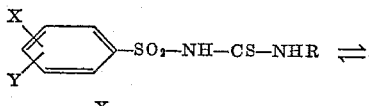

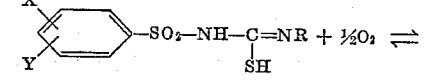

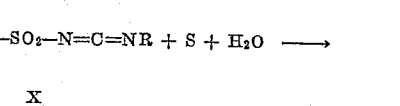

(F)

The following examples serve to illustrate preferred methods of producing the new sulfonyl urea compounds without, however, limiting the same thereto.

EXAMPLE 1

$N_1$-(p-Toluene Sulfonyl)-$N_2$-(3-Methoxy-n-Propyl) Urea Prepared From Di-(p-Toluene Sulfonyl) Urea and 3-Methoxy-n-Propyl-Amine (a) 186 g. of di-(p-toluene sulfonyl) urea, prepared from the sodium metal compound of p-toluene sulfonamide and phosgene in aqueous solution and having a melting point of 108–109° C., are suspended in 400 cc. of water of 50° C. 37 g. of 3-methoxy-n-propylamine are added thereto. A clear solution is obtained which completely crystallizes after standing at room temperature for two days. If seed crystals are available, crystallization may considerably be accelerated by seeding, cooling below room temperature, and stirring. The crystals are filtered off by suction and are washed by means of 75 cc. of ice-cold water. Yield: 150 g. of the 3-methoxy-n-propylamine salt of di-(p-toluene sulfonyl) urea of the melting point 135–138° C. Further amounts of said salt are recovered from the mother liquors either by repeatedly using the mother liquors for salt formation or by concentrating them by evaporation.

(b) 100 g. of the 3-methoxy-n-propylamine salt of di-(p-toluene sulfonyl) urea are heated in a wide-neck flask in an oil bath of the temperature of 110° C. After heating for 15 minutes, the salt starts to sinter and melts, on further heating, to a clear liquid. After heating for 70 minutes, the molten mass is cooled and, after solidification, triturated with 400 cc. of 2.5% sodium bicarbonate solution. p-Toluene sulfonamide, which is formed as a by-product during thermal decomposition, remains thereby undissolved and is filtered off by suction. Yield: 98–100% of the theoretical yield.

The bicarbonate solution contains the resulting $N_1$-(p-toluene sulfonyl)-$N_2$-(3-methoxy-n-propyl) urea. The solution is acidified until Congo red, whereby the urea derivative crystallizes. The crystals are filtered off by suction and washed with water. 58 g. of the pure compound having a melting point of 98–100° C. are obtained. The yield is 92% of the theoretical yield.

When using, in place of di-(p-toluene sulfonyl) urea, equimolecular amounts of di-benzene sulfonyl urea, reacting said di-benzene sulfonyl urea with 3-methoxy-n-propylamine to form the corresponding salt, and thermally decomposing said salt at a temperature of 100–110° C. as described hereinabove, there is obtained the corresponding $N_1$-benzene sulfonyl-$N_2$-(3-methoxy-n-propyl) urea of the melting point 102–105° C.

When using, in place of 3-methoxy-n-propylamine, tetrahydrofuryl-α-methylamine and proceeding otherwise in the same manner as described hereinabove, the corresponding $N_1$-(p-toluene sulfonyl)-$N_2$-(α-tetrahydrofuryl methyl) urea, or, respectively, $N_1$-benzene sulfonyl-$N_2$-(α-tetrahydrofuryl methyl) urea are obtained.

EXAMPLE 2

$N_1$-(p-Toluene Sulfonyl)-$N_2$-(3-Methoxy-n-Propyl) Urea Prepared From p-Toluene Sulfonamide and 3-Methoxy-n-Propyl Isocyanic Acid Ester 24.2 g. of the sodium metal compound of 3-p-toluene sulfonamide are suspended or, respectively, dissolved in 50 cc. of completely anhydrous dimethyl formamide. 18 g. of 3-methoxy-n-propyl isocyanic acid ester are added thereto. The mixture is heated to 45–55° C. for 8 hours. If complete reaction of the isocyanic acid ester is not achieved, the mixture may further be heated for some time. The reaction mixture is then diluted with 200 cc. of water and hydrochloric acid is added thereto to adjust the pH-value to 8.5. After standing for some time, any precipitated p-toluene sulfonamide is filtered off by suction. The mother liquor is repeatedly extracted by means of ether at a pH of 8.5 and, thereupon, is rendered strongly Congo acid. Thereby $N_1$-(p-toluene sulfonyl)-$N_2$-(3-methoxy-n-propyl) urea precipitates. 28.7 g. having a melting point of 98–101° C. are obtained thereby. The yield is 80% of the theoretical yield.

When using, in place of the sodium metal compound of p-toluene sulfonamide, the potassium metal compound of 4-methoxy benzene sulfonamide and reacting said compound with 2-isopropyloxy ethyl isocyanic acid ester as described hereinabove, $N_1$-(4-methoxy benzene sulfonyl)-$N_2$-(2-isopropyloxy ethyl) urea of the melting point 122–126° C. is obtained.

When replacing in the above described reaction the isocyanic acid ester by a cyclic isocyanic acid ester by a cyclic isocyanic acid ester such as tetrahydrofuryl-α-methyl isocyanic acid ester and otherwise proceeding in the same manner, the corresponding $N_2$-(α-tetrahydrofuryl methyl) urea compound is obtained.

EXAMPLE 3

$N_1$-(p-Toluene Sulfonyl)-$N_2$-(3-Methoxy-n-Propyl) Urea Prepared From p-Toluene Sulfonyl Thiourethane And 3-Methoxy-n-Propylamine 21.7 g. of p-toluene sulfonyl ethyl thiourethane prepared from the sodium metal compound of p-toluene sulfonamide and dithiocarbonic acid di-S-ethyl ester by splitting off ethyl mercaptane, are suspended in 100 cc. of 1,2-dichloro benzene. 9 g. of 3-methoxy-n-propylamine are added thereto. The reaction mixture is heated to 100° C. until splitting off of ethyl mercaptan is completed. The reaction is completed after about 6 to 8 hours. Part of the dichloro benzene is distilled off together with ethyl mercaptan formed during reaction. The residue is shaken with sodium carbonate solution in the cold. Hydrochloric acid is added to the sodium carbonate extract, until the pH is 8.5. Thereby some p-toluene sulfonamide precipitates and is removed by filtration. The aqueous solution is once or twice extracted with ether and is then acidified until Congo acid. Thereby $N_1$-(p-toluene sulfonyl)-$N_2$-(3-methoxy-n-propyl) urea precipitates in crystalline form. About 25 g. of said compound, having a melting point of 98–101° C., are obtained. The yield is 87% of the theoretical yield.

$N_1$-(p-toluene sulfonyl)-$N_2$-(α-tetrahydrofuryl methyl) urea of the melting point 133–138° C. is obtained when using tetrahydrofuryl-α-methylamine in place of 3-methoxy-n-propylamine and proceeding otherwise in the same manner as described hereinabove.

EXAMPLE 4

$N_1$-(p-Toluene Sulfonyl)-$N_2$-(3-n-Butoxy-n-Propyl) Urea 39.4 g. of p-toluene sulfonyl isocyanate are dissolved in 400 cc. of benzene. 26.2 g. of 3-n-butoxy-n-propylamine are slowly added drop by drop to the solution while stirring. Thereby the temperature increases to about 45° C. After addition is completed, the solution is heated to boiling under reflux for 1½ hours. Subsequently, benzene is distilled off in a vacuum and the residue is heated with 1. l. of dilute ammonia solution on the steam bath for one hour. Undissolved particles are filtered off, and the filtrate is acidified by the addition of dilute hydrochloric acid. $N_1$-(p-Toluene sulfonyl)-$N_2$-(3-n-butoxy-n-propyl) urea precipitates first in oily form but crystallizes after a short period of time and is filtered off by suction. After drying in the desiccator and recrystallization from acetic acid ethyl ester, the resulting pure compound melts at 69–71° C.

When replacing in the above described reaction the amine by a cyclic amine, such as tetrahydrofuryl-α-methylamine and otherwise proceeding in the same manner, the corresponding $N_2$-(α-tetrahydrofuryl methyl) urea compounds are obtained.

EXAMPLE 5

$N_1$-(o-Toluene Sulfonyl)-$N_2$-(3-Methoxy-n-Propyl) Urea 24.3 g. of o-toluene sulfonyl ethyl urethane and 8.9 g. of 3-methoxy propylamine are heated to 110° C., with stirring, in the presence of 20 cc. of dimethyl formamide. A gradually increasing vacuum is applied for 2 hours. After cooling, the mixture is poured into water and the resulting precipitate filtered off by suction. Purification is achieved by fractional precipitation from a dilute sodium carbonate solution by means of acidification with dilute hydrochloric acid. A 70–80% yield of $N_1$-(o-toluene sulfonyl)-$N_2$-(3-methoxy-n-propyl) urea is obtained with a melting point of 132–133° C.

When replacing in the above described reaction the amine by a cyclic amine, such as tetrahydrofuryl-$\alpha$-methylamine and otherwise proceeding in the same manner, the corresponding $N_2$-($\alpha$-tetrahydrofuryl methyl) urea compounds are obtained.

EXAMPLE 6

$N_1$(p-Isopropyl Benzene Sulfonyl)-$N_2$-(3-Ethoxy-n-Propyl) Urea 28 g. of N-(p-isopropyl benzene sulfonyl) carbamic acid methyl ester of the melting point 99–101° C., which ester is prepared from p-isopropyl benzene sulfonamide and chlorocarbonic acid methyl ester in acetone solution in the presence of potassium carbonate, 30 g. of xylene, and 11.2 g. of 3-ethoxy-n-propylamine are heated to boiling for 6 hours. The reaction mixture is allowed to cool, and the resulting xylene solution is extracted twice, each time with 150 cc. of dilute ammonia solution (1 part of concentrated ammonia solution and 20 parts of water). The ammoniacal extracts are combined, decolorized by means of decolorizing charcoal, and acidified by the addition of dilute hydrochloric acid. A crystalline precipitate of $N_1$-(p-isopropyl benzene sulfonyl)-$N_2$-(3-ethoxy-n-propyl) urea is obtained. After recrystallization from acetic acid ethyl ester, the compound melts at 96–98° C. It is produced in a satisfactory yield.

When replacing, in the above described reaction, the amine by a cyclic amine, such as tetrahydrofuryl-$\alpha$-methylamine, and otherwise proceeding in the same manner, the corresponding $N_2$-($\alpha$-tetrahydrofuryl methyl) urea compounds are obtained.

EXAMPLE 7

$N_1$-(3-Methyloxy-4-Methyl Benzene Sulfonyl)-$N_2$-(3-Methoxy-n-Propyl) Urea 60 g. of N-3-(methoxy-4-methyl benzene sulfonyl) carbamic acid ethyl ester prepared from 3-methoxy-4-methyl benzene sulfonamide and chloro formic acid ethyl ester in acetone in the presence of finely pulverized potassium carbonate, and 24 g. of 3-methoxy-n-propylamine are heated to boiling under reflux in 150 cc. of glycol monomethyl ether for 8 hours. The solvent is distilled off in a vacuum and the residue is dissolved in 500 cc. of water with the addition of molar quantities of sodium hydroxide. The resulting solution is decolorized by the addition of decolorizing charcoal and, after filtration, is carefully acidified by the addition of hydrochloric acid. The precipitate which is first somewhat pasty but, after stirring for a short period of time in the cold, becomes crystalline, is filtered off by suction, thoroughly washed with water, and dissolved in 350 cc. of dilute ammonia solution. The solution is decolorized by the addition of decolorizing charcoal and, after filtration, is acidified by the addition of hydrochloric acid. $N_1$(3-methoxy-4-methyl benzene sulfonyl)-$N_2$-(3-methoxy-n-propyl) urea precipitates in a high yield. It melts, after recrystallization from acetonitrile, at 128–129° C.

In an analogous manner there is obtained by reacting 57 g. of N-(3-methoxy-4-methyl benzene sulfonyl) carbamic acid ethyl ester and 22 g. of $\alpha$-tetrahydrofuryl methyl amine and proceeding otherwise in the same manner as described hereinabove, $N_1$-(3-methoxy-4-methyl benzene sulfonyl)-$N_2$-$\alpha$-tetrahydrofurfuryl urea of the melting point 133° C. on recrystallization from acetonitrile.

Of the compounds of the above given Formula I, which have a cyclic alkyl radical containing at least one hetero atom, the most effective antidiabetic agent is $N_1$-(p-toluene sulfonyl)-$N_2$-($\alpha$-tetrahydrofuryl methyl) urea.

Preferably the compounds of the above given Formula I are administered orally in a pharmaceutical carrier in standard form as tablets, pills lozenges, dragees, and the like shaped and/or compressed preparations. It is also possible to produce emulsions or suspensions of said compounds in water or aqueous media such as unsweetened fruit juices and by means of suitable emulsifying or dispersing agents. The new antidiabetic agents may furthermore be employed in the form of powders filled into gelatin capsules or the like.

Such powders and mixtures to be used in the preparation of tablets and other shaped and/or compressed preparations may be diluted by mixing and milling with a solid pulverulent extending agent to the desired degree of fineness or by impregnating the already milled, finely powdered, solid carrier with a suspension of said compounds in water or with a solution thereof in an organic solvent such as ethanol, methanol, acetone, and others and then removing the water or solvent.

When preparing tablets, pills, dragees, and the like shaped and/or compressed preparations, the commonly used diluting, binding, and disintegrating agents, lubricants, and other tableting adjuvants are employed, provided they are compatible with said sulfonyl urea compounds. Such diluting agents and other excipients are, for instance, sugar, lactose, levulose, starch, bolus alba; as disintegrating and binding agents, gelatin, gum arabic, yeast extract, agar, tragacanth, methyl cellulose, pectin; and as lubricants stearic acid, talc, magnesium stearate, and others.

It is, of course, also possible to administer the new compounds in the form of suppositories whereby the commonly used suppository vehicles, such as cocoa butter, are used.

The amounts of said new sulfonyl urea compounds according to the present invention in antidiabetic pharmaceutical units or dosage according to the present invention may be varied. It is also possible to administer several unit dosage forms at the same time.

The following examples of compositions containing the new sulfonyl urea compounds as they are to be used in diabetes therapy serve to illustrate the present invention without, however, limiting the same thereto.

EXAMPLE 8

10.0 kg. of $N_1$-(p-toluene sulfonyl)-$N_2$-($\alpha$-tetrahydrofuryl methyl) urea are moistened with 3500 cc. of a 1% gelatin solution and are kneaded in a kneader until its initial crystal structure has disappeared. The resulting mixture is granulated and is dried in an air current at about 40° C. 10.350 kg. of granulate are obtained thereby. This granulate is intimately mixed, in a mixing apparatus, with 1550 g. of corn starch and 100 g. of magnesium stearate and compressed by means of a revolving tableting press to tablets having a diameter of 13 mm. and a weight of 0.6 g. Each tablet contains about 0.5 g. of $N_1$-p-toluene sulfonyl)-$N_2$(tetrahydrofuryl methyl) urea.

EXAMPLE 9

Cores of dragees with convex surfaces composed of 0.25 g. of $N_1$-(4-methoxy benzene sulfonyl)-$N_2$-($\alpha$-tetrahydrofuryl methyl) urea and of 0.325 g. of potato starch containing 10% of stearic acid are prepared by compressing such a mixture. Said cores are coated in a dragee-coating vessel by means of sugar sirup and talcum. The last dragee coating contains aromatic, sweetening, and coloring agents and is polished and, if desired, provided with a thin metal foil layer.

EXAMPLE 10

The potasium salt of $N_1$-(p-toluene sulfonyl)-$N_2$-($\alpha$-tetrahydrofuryl methyl) urea is intimately kneaded in finely pulverized state with an aqueous 2% methyl cellulose solution in an amount sufficient to produce a viscous paste and then kneaded. The kneaded mixture is granulated and dried. 8% of starch, calculated for the weight of the potassium salt, and 0.2% of a lubricant are admixed thereto. Semicircular cores of dragees which contain 0.3 g. of $N_1$-(p-toluene sulfonyl)-$N_2$-($\alpha$-tetrahydrofuryl methyl) urea (calculated as the free compound) are pressed therefrom. Said cores are worked up to substantially round dragees.

EXAMPLE 11

0.25 g. of pulverised $N_1$-(o-toluene sulfonyl)-$N_2$-($\alpha$-tetrahydrofuryl methyl) urea are filled into one half of a gelatin capsule and the other half of said capsule is fitted thereover. Both halves are then united and sealed to form a gelatin capsule.

EXAMPLE 12

10 kg. of $N_1$-(o-toluene sulfonyl)-$N_2$-($\alpha$-tetrahydrofuryl methyl) urea are finely pulverized and are mixed in a kneading device with a vegetable or suitable mineral oil in an amount sufficient to produce a suspension which is fluid and can be ejected through a canula. Said suspension is injected by means of a suitable machine, in a predetermined dosage between two plastic gelatin foils and the foils are seamlessly welded with each other. The resulting capsule is completely filled with the sulfonyl urea compound, for instance, in an amount of 0.3 g. per capsule. The foils or the oil can be dyed, rendered opaque, or can otherwise be rendered distinctive.

In the same manner a suitable salt of said sulfonyl urea compound, for instance, the sodium, potassium, calcium, magnesium, ammonium salt, and others, are filled into such capsules whereby the amount of said materials is adjusted so that each capsule contains 0.25 g. calculated for free sulfonyl urea compound.

EXAMPLE 13

10 kg. of $N_1$-(p-toluene sulfonyl)-$N_2$-($\alpha$-tetrahydrofuryl methyl) urea are mixed in a kneader with 2.5 kg. of starch and 1.38 kg. of lactose. This mixture is then further kneaded with a mucilage made from 4 liters of water and 120 g. of gum tragacanth. The resulting moist material is passed through an extrusion press and then through a pill making machine which gives moist pills each weighing 0.18 g.

The moisture is removed by drying in a suitable dryer. The resulting pills weigh 0.14 g. and contain about 0.1 g. of the active sulfonyl urea compound.

In the place of gum tragacanth, there may be employed other binding materials such as methyl cellulose, gum arabic, or magnesium aluminum silicate. It is also possible, by employing different rollers in the pill making machine to produce pills having a higher content of active sulfonyl urea compound.

EXAMPLE 14

A 10% suspension of finely pulverized $N_1$-(m-toluene sulfonyl)-$N_2$-($\alpha$-tetrahydrofuryl methyl) urea in an aqueous 20% sugar solution is prepared. The sugar solution contains methyl cellulose in an amount sufficient to produce a viscous suspension. Aromatic substances, such as oil of cinnamon, aniseed oil, vanillin, or vanilla extract and, if desired, dyestuffs, are added to said suspension which is then filled into bottles or tubes. 10 cc. of such a suspension contain about 1 g. of $N_1$-(m-toluene sulfonyl)-$N_2$-($\alpha$-tetrahydrofuryl methyl) urea.

In place of a 20% sugar solution, there can be used a 50% levulose solution whereby the amount of the sulfonyl urea compound according to the present invention can be increased to 15%. It is, of course, also possible to prepare suspensions of this type which contain only 5% of the sulfonyl urea compound. The sugar may be completely omitted and/or in its place there may be used suitable fruit juices, such as orange juice, grapefruit juice, tomato juice, or the like. As thickening agent there may be used a suitable magnesium aluminum silicate instead of methyl cellulose.

EXAMPLE 15

A 7.87% solution of the magnesium salt of $N_1$-(p-toluene sulfonyl)-$N_2$-($\alpha$-tetrahydrofuryl methyl) urea in an aqueous 50% levulose solution is prepared. Aromatic compounds may be added thereto in order to mask the taste of the active ingredient. The solution can be rendered more viscous by the addition of methyl cellulose. 20 cc. of such a solution contain 1.5 g. of the sulfonyl urea compound calculated for its free form.

EXAMPLE 16

Finely pulverized $N_1$-(p-toluene sulfonyl)-$N_2$-($\alpha$-tetrahydrofuryl methyl) urea is intimately mixed with a molten suppository of a fatty acid ester base or of a polyethylene glycol base. The mixture is poured into a suppository mold. The resulting suppositories contain about 1.0 g. of the sulfonyl urea compound.

The blood sugar lowering compounds of this group of substituted sulfonyl urea compounds according to the present invention are capable of forming alkali metal, alkaline earth metal, and ammonium salts, and especially potassium, sodium, and magnesium metal salts, as well as salts with various organic amines which are compatible to the human system. Some of said salts are of considerable importance in view of their high water solubility. For instance, the sodium and magnesium metal salts are readily soluble in water so that injectable aqueous solutions can be prepared. Such solutions can be used in cases where intravenous administration is desired. The dosage is about the same as on oral administration.

Such salts are prepared in the usual manner, for instance, by adding a metal hydroxide to the sulfonyl urea compounds: these urea compounds are relatively strong acids. It is also possible to produce salts with organic bases which are compatible to the human system in the amounts administered.

The salts set forth herein are useful in the treatment of diabetes in like manner as the compounds set forth herein, administered in the same dosage and in the time sequence as said compounds.

The preferred initial clinical dose given orally to diabetic patients is between about 2.0 g. and about 6.0 g. of the sulfonyl urea compounds of the above mentioned Formula I. As soon as a satisfactory blood sugar level is attained, such a level is maintained by administering a single dose between 0.2 g. and 3.0 g. per day, or, if desired, subdivided up to 4 separate doses of 0.2 g. to 0.75 g. per dose. Of course, these dosages may be varied at the discretion of the attending physician and depending upon the specific compound used and the specific condition of the patient to whom it is administered.

We claim:

$N_1$-(p-toluene sulfonyl)-$N_2$-($\alpha$-tetrahydrofuryl methyl) urea.

References Cited in the file of this patent

UNITED STATES PATENTS

| | | |
|---|---|---|
| 2,813,902 | Margat et al. | Nov. 19, 1957 |
| 2,891,960 | Ruschig et al. | June 23, 1959 |
| 2,953,578 | Haack et al. | Sept. 20, 1960 |

FOREIGN PATENTS

| | | |
|---|---|---|
| 70,259 | Denmark | Nov. 28, 1949 |